US009869867B2

(12) United States Patent
Tajiri

(10) Patent No.: US 9,869,867 B2
(45) Date of Patent: Jan. 16, 2018

(54) LIGHT SOURCE DEVICE AND DISPLAY DEVICE

(71) Applicant: Sony Corporation, Tokyo (JP)

(72) Inventor: Shinichiro Tajiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 97 days.

(21) Appl. No.: 14/205,401

(22) Filed: Mar. 12, 2014

(65) Prior Publication Data

US 2014/0285772 A1    Sep. 25, 2014

(30) Foreign Application Priority Data

Mar. 22, 2013  (JP) .................................. 2013-060060

(51) Int. Cl.

| G02B 27/10 | (2006.01) |
|---|---|
| F21V 13/08 | (2006.01) |
| F21V 9/16 | (2006.01) |
| G02B 27/14 | (2006.01) |
| G03B 21/20 | (2006.01) |
| G03B 33/06 | (2006.01) |
| H04N 9/31 | (2006.01) |

(52) U.S. Cl.
CPC ............ *G02B 27/1006* (2013.01); *F21V 9/16* (2013.01); *F21V 13/08* (2013.01); *G02B 27/141* (2013.01); *G03B 21/204* (2013.01); *G03B 33/06* (2013.01); *H04N 9/3158* (2013.01)

(58) Field of Classification Search
CPC .............. G03B 21/204; G03B 21/2013; H04N 9/3161; H04N 9/3164; H04N 9/3197
USPC ........ 353/30, 31, 33, 37, 38, 84, 85, 94, 98, 353/102; 362/231, 284, 293, 324, 555, 362/583
See application file for complete search history.

(56) References Cited

U.S. PATENT DOCUMENTS

| 7,547,114 | B2* | 6/2009 | Li | ........................... G03B 33/06 |
|---|---|---|---|---|
| | | | | 353/20 |
| 9,039,187 | B2* | 5/2015 | Katou | ....................... G02B 5/26 |
| | | | | 353/30 |
| 2010/0328627 | A1* | 12/2010 | Miyazaki | ........................ 353/85 |
| 2010/0328632 | A1* | 12/2010 | Kurosaki | ............. G03B 21/204 |
| | | | | 353/98 |
| 2011/0249242 | A1* | 10/2011 | Saitou | .................. G03B 21/204 |
| | | | | 353/98 |

(Continued)

FOREIGN PATENT DOCUMENTS

JP    2012-027052 A    2/2012

*Primary Examiner* — Sultan Chowdhury
(74) *Attorney, Agent, or Firm* — Chip Law Group

(57) ABSTRACT

There is provided a light source device including a first light source configured to emit light in a first wavelength region, a second light source configured to emit light in a second wavelength region different from the first wavelength region, a wavelength conversion unit including a fluorescent material and configured to emit fluorescent emission light in a different wavelength region upon irradiation with the light in the first wavelength region, and a combining unit that has wavelength selectivity to a specific wavelength region corresponding to the second wavelength region and combines the light in the first wavelength region from the first light source, the light in the second wavelength region from the second light source, and the fluorescent emission light which are incident on the combining unit with one another.

13 Claims, 13 Drawing Sheets

(56) References Cited

U.S. PATENT DOCUMENTS

| | | | | |
|---|---|---|---|---|
| 2012/0106126 A1* | 5/2012 | Nojima | ................ | G02B 26/008 |
| | | | | 362/84 |
| 2012/0127435 A1* | 5/2012 | Kitano et al. | .................... | 353/20 |
| 2012/0140183 A1* | 6/2012 | Tanaka et al. | ................... | 353/20 |
| 2012/0147332 A1* | 6/2012 | Huang | ............... | G03B 21/2013 |
| | | | | 353/31 |
| 2012/0268917 A1* | 10/2012 | Kitano | ................. | H04N 9/3105 |
| | | | | 362/84 |

* cited by examiner

LIGHT SOURCE DEVICE AND DISPLAY DEVICE

CROSS REFERENCE TO RELATED APPLICATIONS

This application claims the benefit of Japanese Priority Patent Application JP 2013-060060 filed Mar. 22, 2013, the entire contents of which are incorporated herein by reference.

BACKGROUND

The present disclosure relates to a light source device used for a display device such as a projector and a display device including the same.

A light source for a projector mainly employs an extra-high pressure mercury lamp in view of brightness and cost performance, and meanwhile, a solid-state light source, which has long service life and wide color gamut, has attention in view of the long service life and additional high functions. The solid-state light source is a light source utilizing light emission from a p-n junction of semiconductor, such as an LED and a laser diode (LD). Recently, for example, as in JP 2012-27052A, a light source device is used for a projector in which device the solid-state light source irradiates, with light, a fluorescent material which is irradiated with the light in a specific wavelength region to emit light in a different wavelength region and the resulting fluorescent emission light is utilized.

For example, FIG. 9 represents a transmission-type light source device 10A for collecting light emitted from a first light source 11 on a transmission member 14a such as glass on which a fluorescent material 13 is provided using a lens 12 and outputting the light having passed through the transmission member 14a to be parallel light using a lens 15. FIG. 10 represents a reflection-type light source device 10B for collecting light emitted from the first light source 11 on a reflection member 14d on which the fluorescent material 13 is provided using a lens 17 and reflecting the light reflected by the reflection member 14d with a dichroic mirror 16 to be outputted.

Such light source devices using a fluorescent material have a merit of long service life compared with an existing high pressure mercury lamp used for a projector. Usage of a fluorescent material can also reduce speckle noise of glistening spots on the surface of the irradiated object.

SUMMARY

Meanwhile, a fluorescent material with an emission spectrum suitable for a projector has not yet been put into practical use in fact.

A light source for a projector is desirable to present the standardized color gamut and white for a video display device based on the DCI standard or the sRGB standard as illustrated in FIG. 11. In order to present such color gamut, ideal one is a light source with emission spectra for the blue wavelength region, the green wavelength region and the red wavelength region as illustrated in FIG. 12. Such a light source with the emission spectra can present colors close to those in the standard for the primary colors of red, green and blue and for white in presenting the primary colors at the same time.

Methods for realizing the spectra using fluorescent substances include a method of using a mixture of fluorescent substances with the individual emission spectra. For example, as illustrated in FIG. 13, a mixture of a fluorescent substance A having the blue light emission wavelength region, a fluorescent substance B having the green light emission wavelength region and a fluorescent substance C having the red light emission wavelength region is used. The light emission of fluorescent substances, however, suffers luminance saturation and temperature quenching, these meaning the strong light which is incident on the fluorescent substances to cause a decrease of the fluorescent light emission efficiency as illustrated in FIG. 14. Therefore, the fluorescent substances low in light emission efficiency do not promise a light source bright and excellent in efficiency.

It is desirable to attain a light source device high in efficiency and excellent in color reproducibility.

According to an embodiment of the present disclosure, there is provided a light source device including a first light source configured to emit light in a first wavelength region, a second light source configured to emit light in a second wavelength region different from the first wavelength region, a wavelength conversion unit including a fluorescent material and configured to emit fluorescent emission light in a different wavelength region upon irradiation with the light in the first wavelength region, and a combining unit that has wavelength selectivity to a specific wavelength region corresponding to the second wavelength region and combines the light in the first wavelength region from the first light source, the light in the second wavelength region from the second light source, and the fluorescent emission light which are incident on the combining unit with one another.

According to an embodiment of the present disclosure, there is provided a light source device including a first light source configured to emit light in a first wavelength region, a second light source configured to emit light in a second wavelength region different from the first wavelength region, a wavelength conversion unit including a fluorescent material and configured to emit fluorescent emission light in a different wavelength region upon irradiation with the light in the first wavelength region, and a combining unit that has wavelength selectivity to a specific wavelength region corresponding to the first wavelength region and the second wavelength region and combines the light in the first wavelength region from the first light source, the light in the second wavelength region from the second light source, and the fluorescent emission light which are incident on the combining unit with one another.

According to an embodiment of the present disclosure, there is provided a display device including a light source unit, a light modulating/combining system configured to modulate and combine incident light, an illumination optical system configured to guide light emitted from the light source unit to the light modulating/combining system, and a projection optical system configured to perform projection of an image emitted from the light modulating/combining system. The light source unit includes a first light source configured to emit light in a first wavelength region, a second light source configured to emit light in a second wavelength region different from the first wavelength region, a wavelength conversion unit including a fluorescent material and configured to emit fluorescent emission light in a different wavelength region upon irradiation with the light in the first wavelength region, and a combining unit that has wavelength selectivity to a specific wavelength region corresponding to the second wavelength region and combines the light in the first wavelength region from the first light source, the light in the second wavelength region from the second light source, and the fluorescent emission light which are incident on the combining unit with one another.

According to an embodiment of the present disclosure, there is provided a display device including a light source unit, a light modulating/combining system configured to modulate and combine incident light, an illumination optical system configured to guide light emitted from the light source unit to the light modulating/combining system, and a projection optical system configured to perform projection of an image emitted from the light modulating/combining system. The light source unit includes a first light source configured to emit light in a first wavelength region, a second light source configured to emit light in a second wavelength region different from the first wavelength region, a wavelength conversion unit including a fluorescent material and configured to emit fluorescent emission light in a different wavelength region upon irradiation with the light in the first wavelength region, and a combining unit that has wavelength selectivity to a specific wavelength region corresponding to the first wavelength region and the second wavelength region and combines the light in the first wavelength region from the first light source, the light in the second wavelength region from the second light source, and the fluorescent emission light which are incident on the combining unit with one another.

According to an embodiment of the present disclosure, the wavelength conversion unit combines the fluorescent emission light obtained by conversion of the light in the first wavelength region, the light in the first wavelength region from the first light source, and the light in the second wavelength region from the second light source with one another on a same axis. The combined light has the wavelength spectra of the first wavelength region, the second wavelength region and the fluorescent emission light. Thereby, the light in the first wavelength region from the first light source and the fluorescent emission light, which have a deficiency in their emission spectra, can be effectively supplemented with the light in the second wavelength region using the second light source.

As described above, according to the present disclosure, a light source device high in efficiency and excellent in color reproducibility can be attained.

DETAILED DESCRIPTION OF THE EMBODIMENT(S)

Figure 1:
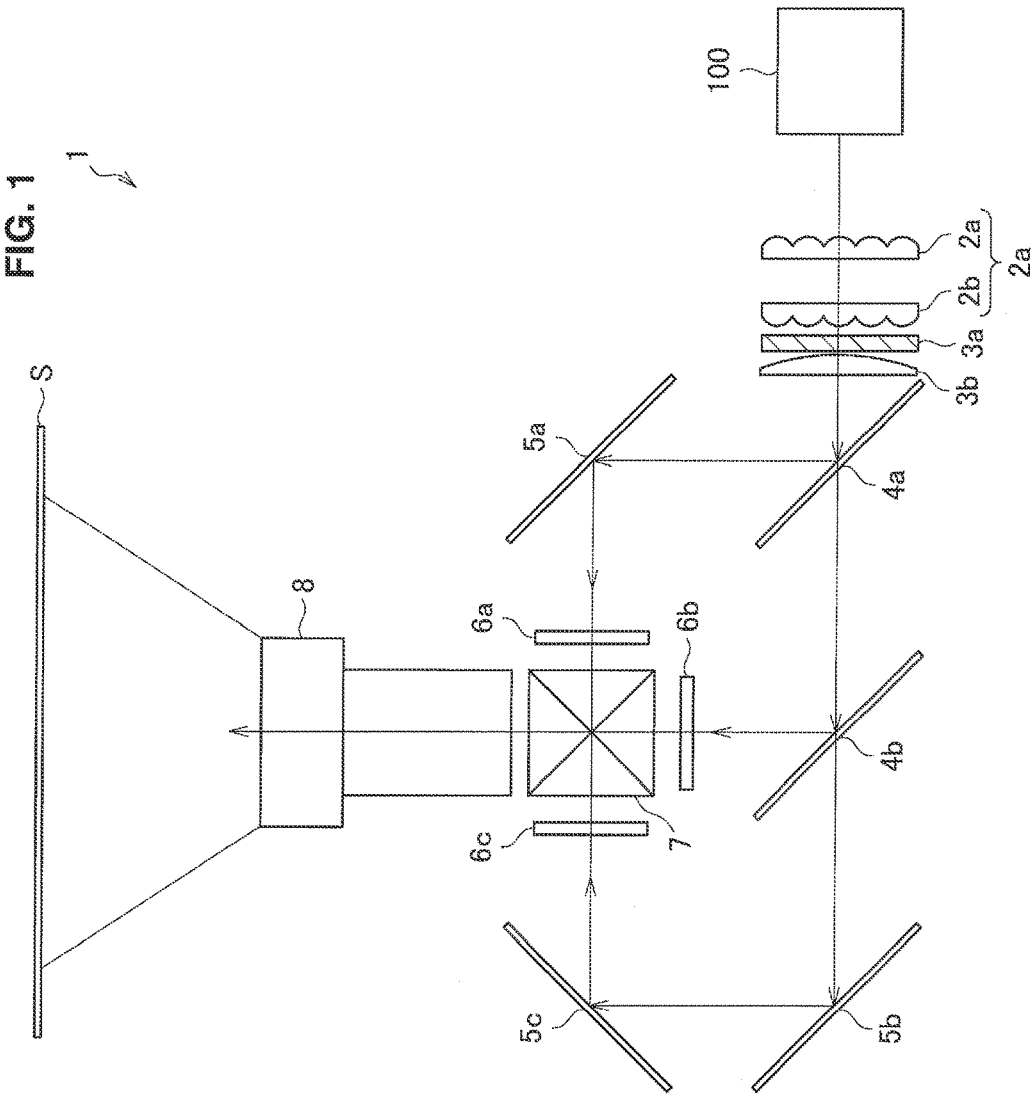
FIG. 1 is a schematic configuration diagram illustrating one exemplary configuration of a display device including a light source unit according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Incidentally, the description is made in the following order.
1. First Embodiment (Light Source Unit Including Two Dichroic Mirrors)
　1.1. Configuration of Display Device
　1.2. Configuration of Light Source Unit
2. Second Embodiment (Light Source Unit Including One Dichroic Mirror)

1. First Embodiment

[1.1. Configuration of Display Device]

First, referring to FIG. 1, one exemplary configuration of a display device 1 including a light source unit 100 according to a first embodiment of the present disclosure is described. FIG. 1 is a schematic configuration diagram illustrating one exemplary configuration of the display device 1 including the light source unit 100 according to the embodiment.

The display device 1 according to the embodiment represents one exemplary configuration of a projector for collecting light from a light source which emits the light, emitting the light from a projection lens through a device causing display of an image, and projecting the image on a display plane such as a screen S. The display device 1 illustrated in FIG. 1 is one exemplary configuration of a projector using 3 LCDs as microdisplays.

Light emitted from the light source unit 100 passes through an integrator lens 2 constituted of a first lens array 2a and a second lens array 2b in order to maintain its brightness still at the edges of the display image, after that, passes through a polarization conversion element 3a and a condenser lens 3b, and is separated into components for individual wavelength regions.

The light having passed through the condenser lens 3b is incident on a first reflection dichroic mirror 4a reflecting only the light in the red wavelength region and allowing the light in the other wavelength regions to pass through. Thereby, the light in the red wavelength region is reflected by the first reflection dichroic mirror 4a and proceeds toward a reflection mirror 5a. The light in the red wavelength region is further reflected by the reflection mirror 5a and is incident on a red liquid crystal panel 6a.

The light in the other wavelength regions having passed through the first reflection dichroic mirror 4a is incident on a second reflection dichroic mirror 4b. The second reflection dichroic mirror 4b reflects only the light in the green wavelength region and allows the light in the other wavelength region, that is, the light in the blue wavelength region to pass through. The light in the green wavelength region reflected by the second reflection dichroic mirror 4b is incident on a green liquid crystal panel 6b. Moreover, the light in the blue wavelength region having passed through the second reflection dichroic mirror 4b is reflected by reflection mirrors 5b and 5c, and after that, is incident on a blue liquid crystal panel 6c.

Each of the liquid crystal panels 6a to 6c for the individual colors modulates the light incident on each of those according to an input image signal, and generates signal light of the image corresponding to each of R, G and B. For the liquid crystal panels 6a to 6c, for example, transmissive liquid crystal elements using high temperature polysilicon TFTs may be employed. The signal light obtained by the modulation with each of the liquid crystal panels 6a to 6c is allowed to be incident on a dichroic prism 7 and the individual components thereof are combined with one another. The dichroic prism 7 is formed into a rectangular solid with four triangular prisms to reflect the red signal light and the blue signal light but to allow the green signal light to pass through. The signal light for the colors obtained by the combining with the dichroic prism 7 is incident on a projection lens 8 to be projected on the display plane of the screen S or the like as an image.

In the display device 1, the liquid crystal panels 6a to 6c and the dichroic prism 7 function as a light modulating/combining system for modulating and combining the incident light. Moreover, the integrator lens 2, the polarization conversion element 3a, the condenser lens 3b, the reflection dichroic mirrors 4a and 4b and the reflection mirrors 5a to 5c function as an illumination optical system for guiding the light from the light source unit 100 to the liquid crystal panels 6a to 6c constituting the light modulating/combining system. Furthermore, the projection lens 8 functions as a projection optical system for projecting the image emitted from the dichroic prism 7.

[1.2. Configuration of Light Source Unit]

Figure 13:
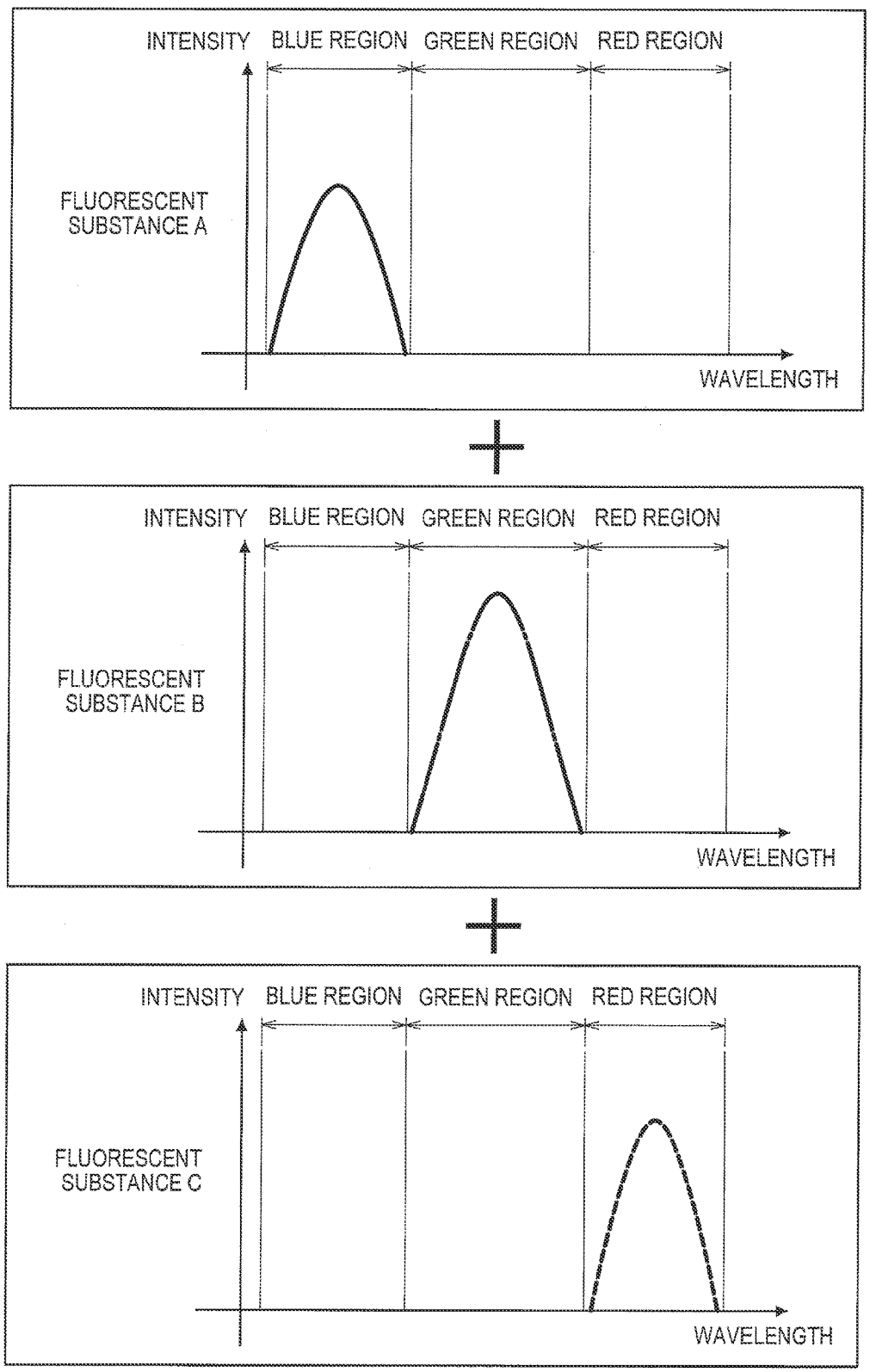
FIG. 13 is an explanatory drawing of a concept of mixing a plurality of fluorescent substances.
Figure 14:
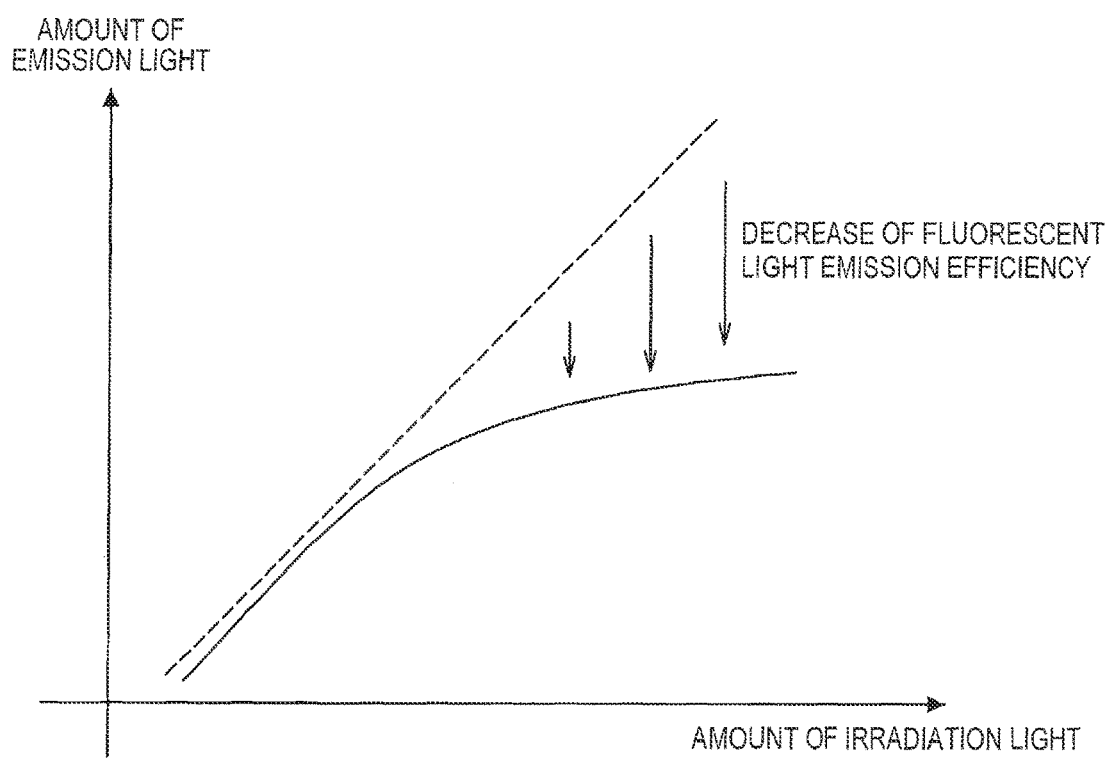
FIG. 14 is an explanatory drawing of a decrease of fluorescent light emission efficiency caused by luminance saturation and temperature quenching.

As the light source unit 100 of such a display device 1, in the present technology, a light source device is employed in which a solid-state light source irradiates a fluorescent material with light and the resulting fluorescent emission light is utilized. Few fluorescent materials are excellent in heat durability and light stability in terms of light emission efficiency and some suffer luminance saturation and temperature quenching to cause a decrease of the fluorescent light emission efficiency. For example, since SCASN-based or CASN-based fluorescent materials with the emission spectra of the primary colors illustrated in FIG. 13 rapidly cause luminance saturation and temperature quenching, a bright light source is difficult to be attained. Namely, the fluorescent material irradiated with strong light from a laser or the like causes a decrease of the fluorescent light emission efficiency, but a less irradiation amount of the light causes a less fluorescent emission light intensity in turn, this leading to the light emitted from the light source unit 100 to be less bright.

Figure 2:
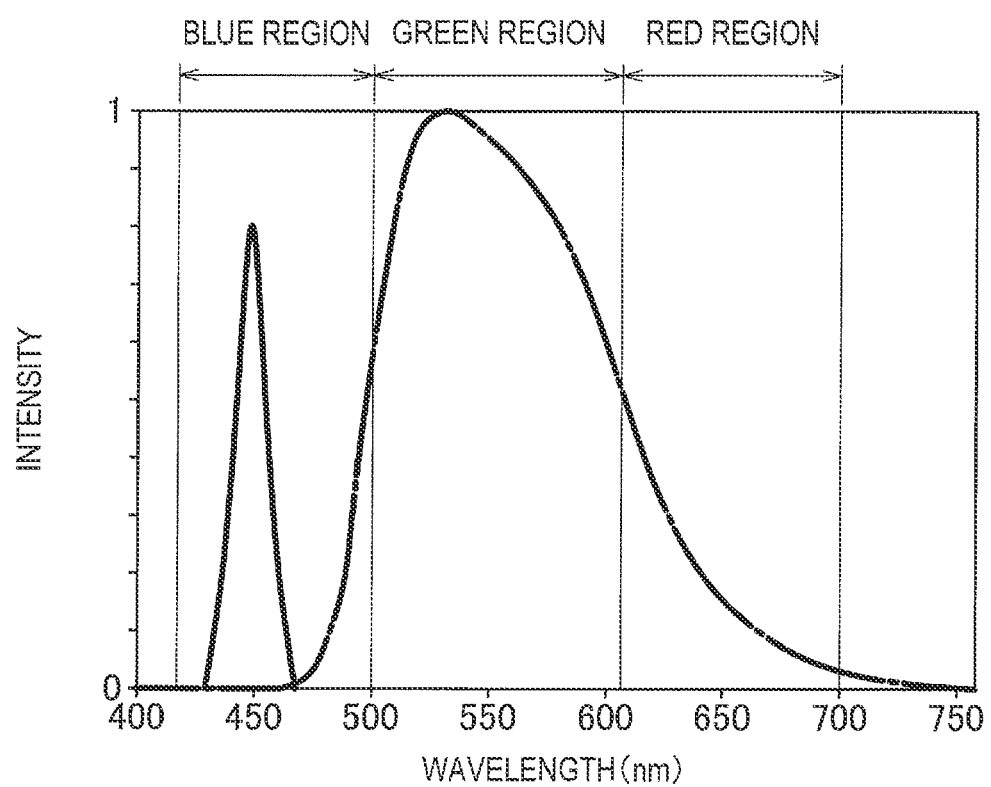
FIG. 2 is a graph illustrating a representative emission spectrum of a YAG-based fluorescent material and a spectrum of excited light.

A YAG-based fluorescent material is a fluorescent material that hardly causes luminance saturation and temperature quenching and can attain a light source to be bright. FIG. 2 illustrates representative emission spectra for the YAG-based fluorescent material. Irradiation light (exciting light) of the YAG-based fluorescent material typically employs blue light and the blue light and fluorescent emission light of the YAG-based fluorescent material can be used for the light source. Namely, the emission spectrum (solid line) in the blue wavelength region illustrated in FIG. 2 is the emission spectrum of the irradiation light and the emission spectrum (dot and dash line) in the green wavelength region is the emission spectrum attributable to the fluorescent emission light of the YAG-based fluorescent material. Compared with the ideal emission spectra illustrated in FIG. 12, the emission spectra illustrated in FIG. 2 are weak as to the light in the red wavelength region and present imbalance for the three primary colors. Presenting white based on these emission spectra causes white considerably close to pale blue to be presented.

Figure 3:
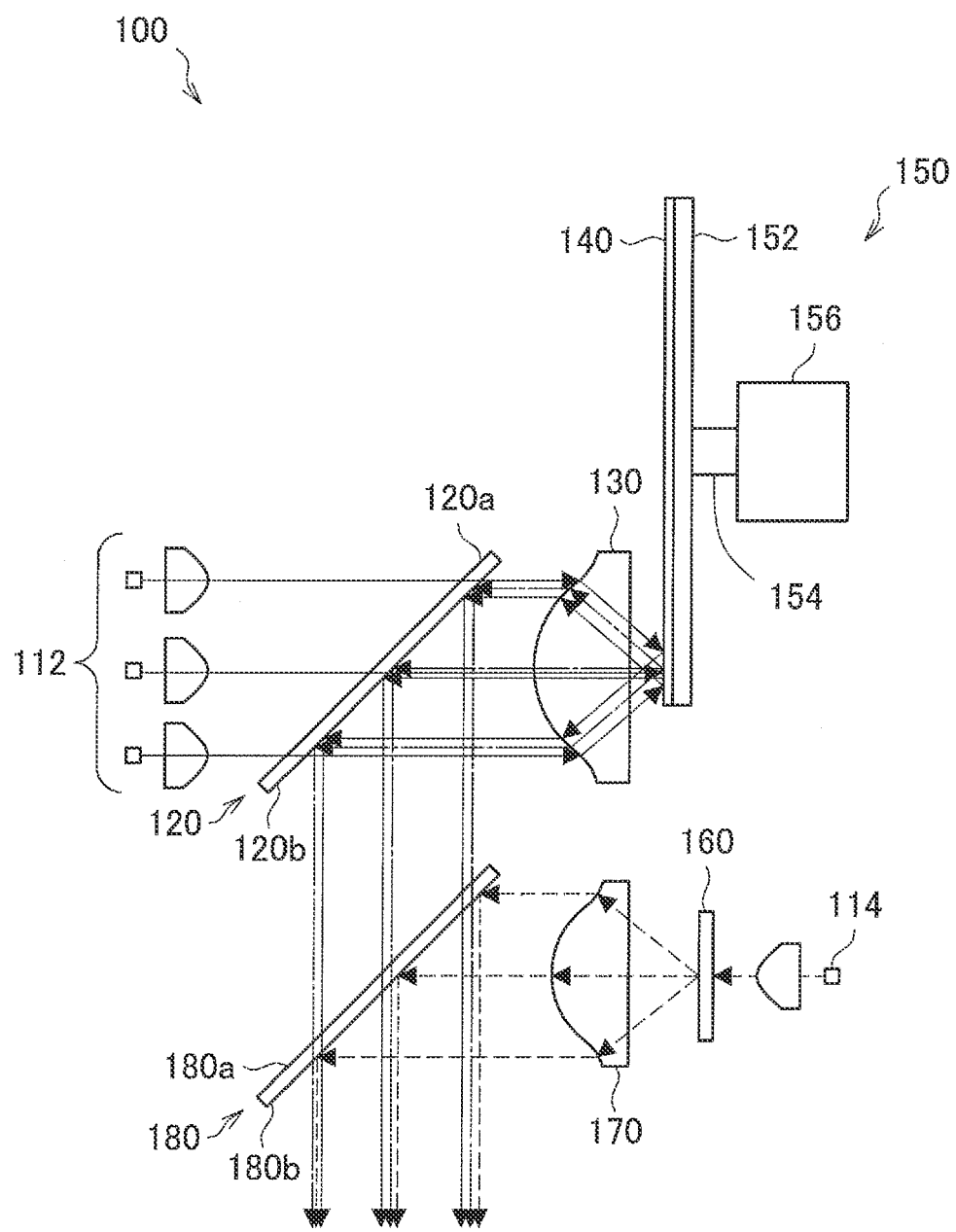
FIG. 3 is a schematic configuration diagram illustrating a configuration of the light source unit according to the embodiment.
Figure 12:
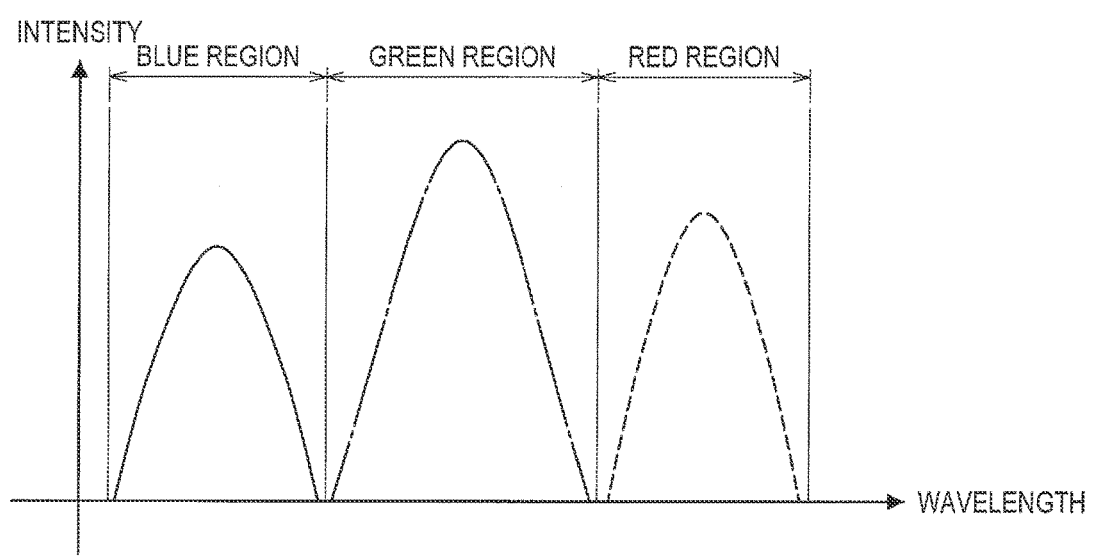
FIG. 12 is an explanatory drawing illustrating an example of ideal emission spectra of a light source.

In consideration of the above, the light source unit 100 according to the embodiment is configured to supplement the emission spectra for the fluorescent material with light in a wavelength region of the color lacking therein to be close to the ideal emission spectra illustrated in FIG. 12. FIG. 3 illustrates a configuration of the light source unit 100 according to the embodiment. The light source unit 100 illustrated in FIG. 3 is a light source device using a reflection-type fluorescent material.

Figure 4:
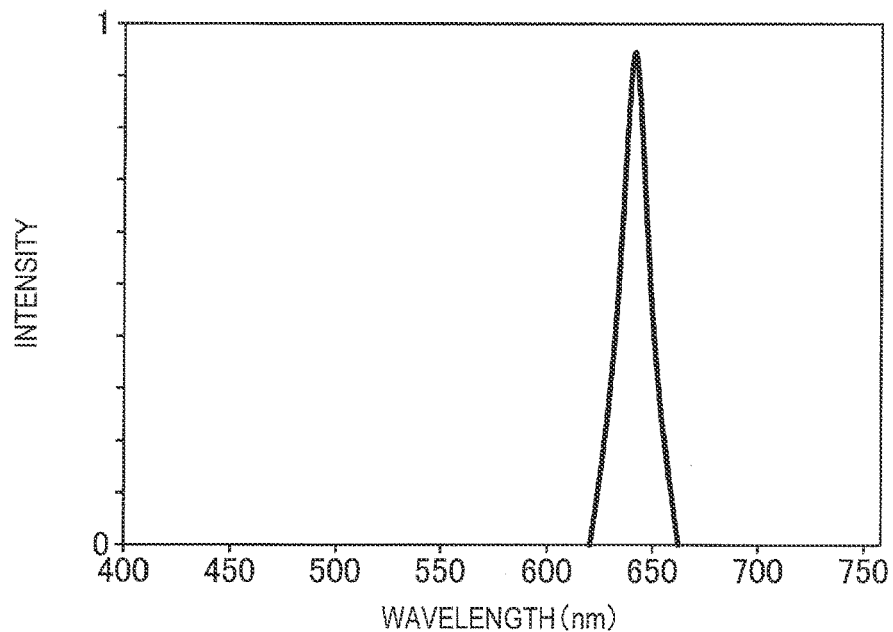
FIG. 4 is a graph illustrating one example of a wavelength spectrum for a laser emitting light in the red wavelength region.

As illustrated in FIG. 3, the light source unit 100 according to the embodiment includes a first light source 112 and a second light source 114 as light sources. The first light source 112 is a light source for irradiating (for exciting) a fluorescent material and may employ, for example, a laser. The first light source 112 allows a fluorescent material which is a wavelength conversion unit to emit light efficiently and employs a laser with the blue wavelength region (approximately 420 to 500 nm) in the embodiment. The second light source 114 emits light in a wavelength region of the color lacking in the first light source 112 and in the fluorescent emission light with the fluorescent material. Since the first light source 112 employs a laser with the blue wavelength region and the fluorescent material employs a YAG-based fluorescent material in the embodiment, the light with the wavelength spectra as illustrated in FIG. 2 is obtained. The light is weak in the red wavelength region (approximately 610 to 700 nm), and therefore, the second light source 114 according to the embodiment is configured, for example, of a laser emitting light in the red wavelength region as illustrated in FIG. 4.

Light emitted from the first light source 112 is allowed to be light in two wavelength regions with a first dichroic mirror 120, a lens 130 and a fluorescent material 140 which is provided in a rotation wheel unit 150, these constituting the light source unit 100. The lens 130 is disposed on the same optical path as that of first light source 112 and the first dichroic mirror 120 is disposed between the first light source 112 and the lens 130. The first dichroic mirror 120 is provided, for example, to incline by approximately 45° relative to the optical path between the first light source 112 and the lens 130. Moreover, the fluorescent material 140 is disposed such that the lens 130 collects the light on the fluorescent material 140. Here, the lens 130 is desirable to collect the light on the circumferential part of a wheel 152 rather than the vicinity of the center thereof in order to enhance cooling performance of the wheel 152 as mentioned later.

The light emitted from the first light source 112 is incident on a first plane 120a of the first dichroic mirror 120. The first dichroic mirror 120 allows the light of the first light source 112 incident on the first plane 120a to pass through. Moreover, the first dichroic mirror 120 reflects, on a second plane 120b, the reflected light led from the first light source 112 and fluorescent emission light from the fluorescent material 140 which is disposed opposite to the first light source 112 via the first dichroic mirror 120 and the lens 130. The light emitted from the first light source 112 passes through the first dichroic mirror 120 and is collected with the lens 130 for irradiation of the fluorescent material 140.

The fluorescent material 140 is a YAG-based fluorescent material. Upon irradiation with the light in the blue wavelength region from the first light source 112, it absorbs the light and emits light in a different wavelength region from the blue wavelength region. The fluorescent material 140 is applied, for example, on the wheel 152 in a disc shape which is made of metal such as aluminum as illustrated in FIG. 3. The fluorescent material 140 may be applied on the entire surface of the wheel 152 or only on the circumferential part thereof.

The wheel 152 is rotated by a driving unit 156 such as a motor about a rotation shaft 154 which is the rotation center and provided at the center of the wheel 152, constituting the rotation wheel unit 150. This is a mechanism for preventing the wheel 152 from holding the heat due to the irradiation with the light, and thus, causing a decrease of the light emission efficiency of the fluorescent material 140 and preventing a melt of a resin used for adhesion of the fluorescent material 140 with the wheel 152. The rotation of the wheel 152 with the rotation wheel unit 150 to rotate the fluorescent material 140 can enhance cooling performance of the wheel 152 and improve light emission efficiency of the fluorescent material 140.

The fluorescent emission light emitted from the fluorescent material 140 is, for example, light in the green wavelength region and passes through the lens 130 along with the light in the blue wavelength region which is not absorbed by the fluorescent material 140 and is reflected on the wheel 152 to be incident on the second plane 120b of the first dichroic mirror 120. Here, the light in the blue wavelength region which is reflected on the surface of the wheel 152 can be efficiently reflected by the first dichroic mirror 120 when a function of rotating or scrambling polarized light is provided. The first dichroic mirror 120 reflects the fluorescent emission light and the reflected light which are incident on the second plane 120b toward a second dichroic mirror 180.

Meanwhile, the light emitted from the second light source 114 is incident on the second dichroic mirror 180 via a diffusion lens 160 and a lens 170 which constitute the light source unit 100. The diffusion lens 160 and the lens 170 are disposed sequentially on the same optical path as that of the second light source 114 and the second dichroic mirror 180 is disposed on the path beyond them. The reflected light on the first dichroic mirror 120 is also incident on the second dichroic mirror 180, therefore, which is provided at the position where the incident direction of the reflected light crosses the optical path of the second light source 114, the diffusion lens 160 and the lens 170. The second dichroic mirror 180 is provided, for example, to be substantially parallel to the first dichroic mirror 120 and to incline by approximately 45° relative to the optical path of the second light source 114, the diffusion lens 160 and the lens 170.

Figure 5:
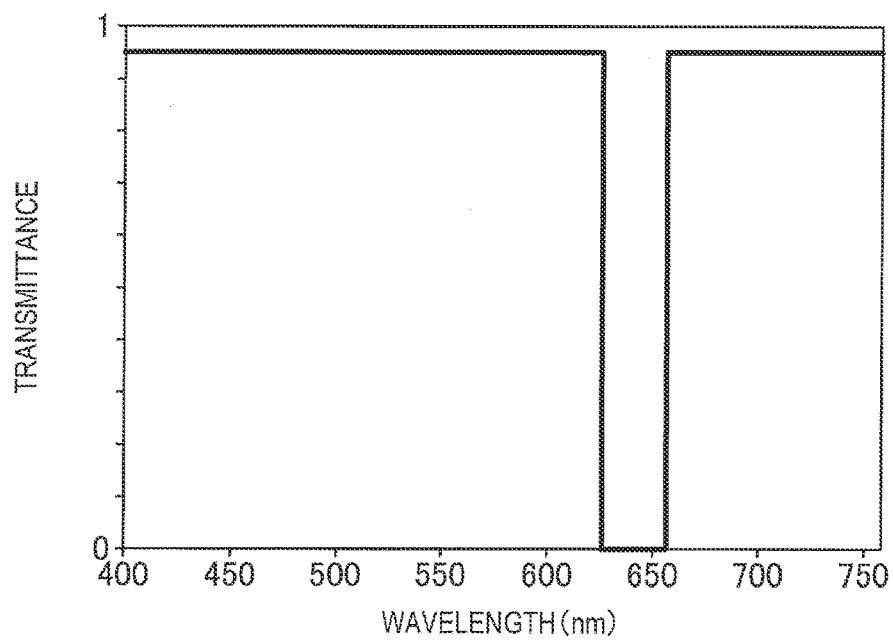
FIG. 5 is an explanatory drawing illustrating one example of characteristics of a second dichroic mirror.

The second dichroic mirror 180 allows the fluorescent emission light and the reflected light which are reflected by the first dichroic mirror 120 and incident on the first plane 180a to pass through and reflects the light of the second light source 114 which is incident on the second plane 180b. Namely, the second dichroic mirror 180 functions as a filter having characteristics in which light in a specific wavelength region to be combined is reflected and light in the other wavelength regions is allowed to pass through. The second dichroic mirror 180 is configured, for example, to have characteristics of a notch filter as illustrated in FIG. 5. Thereby, it reflects only the light in the wavelength region which is led from the second light source 114 and incident on the second plane 180b as illustrated in FIG. 4.

The second dichroic mirror 180 is configured to limit the reflected light to a part thereof corresponding to the wavelength region of the second light source 114 for supplementation. Narrowing the wavelength region to be filtered with the second dichroic mirror 180 allows the light in the red wavelength region which is contained in the fluorescent emission light with the fluorescent material 140 out of the light incident from the first dichroic mirror 120 to be reflected to as less an extent as possible. The second light source 114 for supplementation with the light in the red wavelength region according to the embodiment is typically weak in output and the second light source 114 can be insufficient for the supplementation. Therefore, in order to use the light in the red wavelength region contained in the fluorescent emission light effectively, the second dichroic mirror 180 is configured to be a narrow band filter such as a notch filter.

Figure 6:
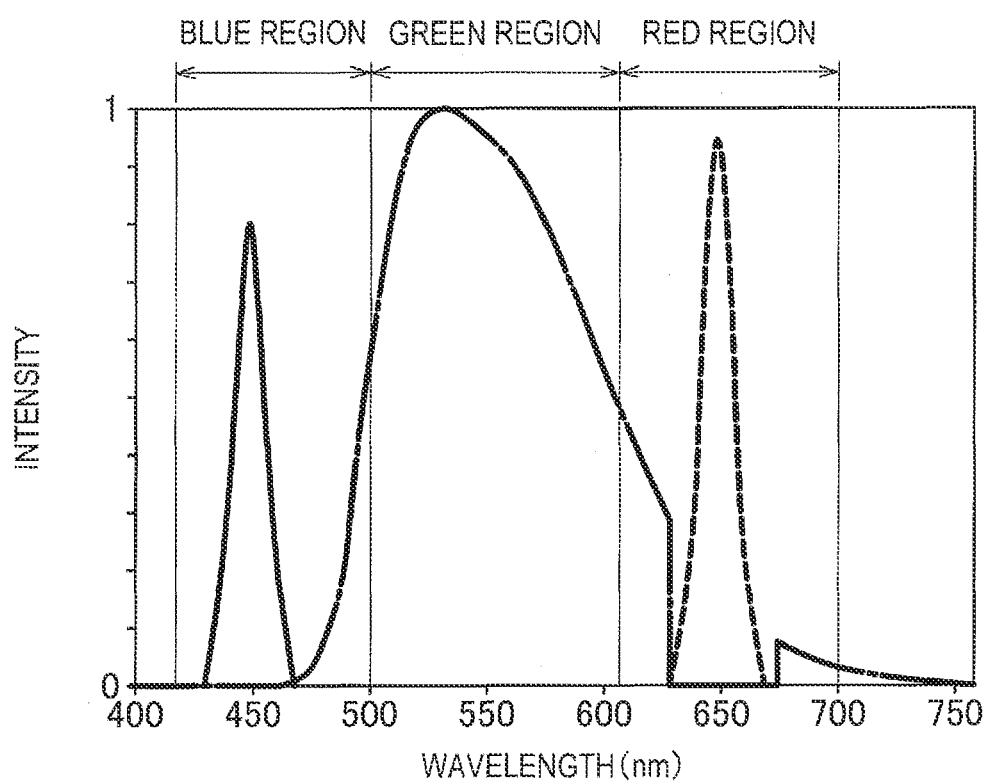
FIG. 6 is an explanatory drawing illustrating one example of a wavelength spectrum of light emitted from the light source unit according to the embodiment.

Thus, the second dichroic mirror 180 combines the light in the red wavelength region led from the second light source 114 onto the emitted light led from the first light source 112 constituted of the fluorescent emission light and the reflected light. The resulting light has wavelength spectra, for example, as illustrated in FIG. 6 eventually. The emission spectrum (broken line) for the red wavelength region in FIG. 6 is attributable to the light from the second light source 114. As above, according to the light source unit 100 according to the embodiment, the light led from the first light source 112 and the fluorescent emission light with the fluorescent material 140, which have a deficiency in their emission spectra, can be effectively supplemented with the light in the red wavelength region using the second light source 114.

Moreover, as in the light source unit 100 according to the embodiment, employing a laser as the second light source 114 for supplementation narrows the width of the emission spectrum. Thereby, the light in the red wavelength region contained in the fluorescent emission light can be cut to as less an extent as possible and the cut light in the red wavelength region can be supplemented by the second light source 114.

2. Second Embodiment

Figure 7:
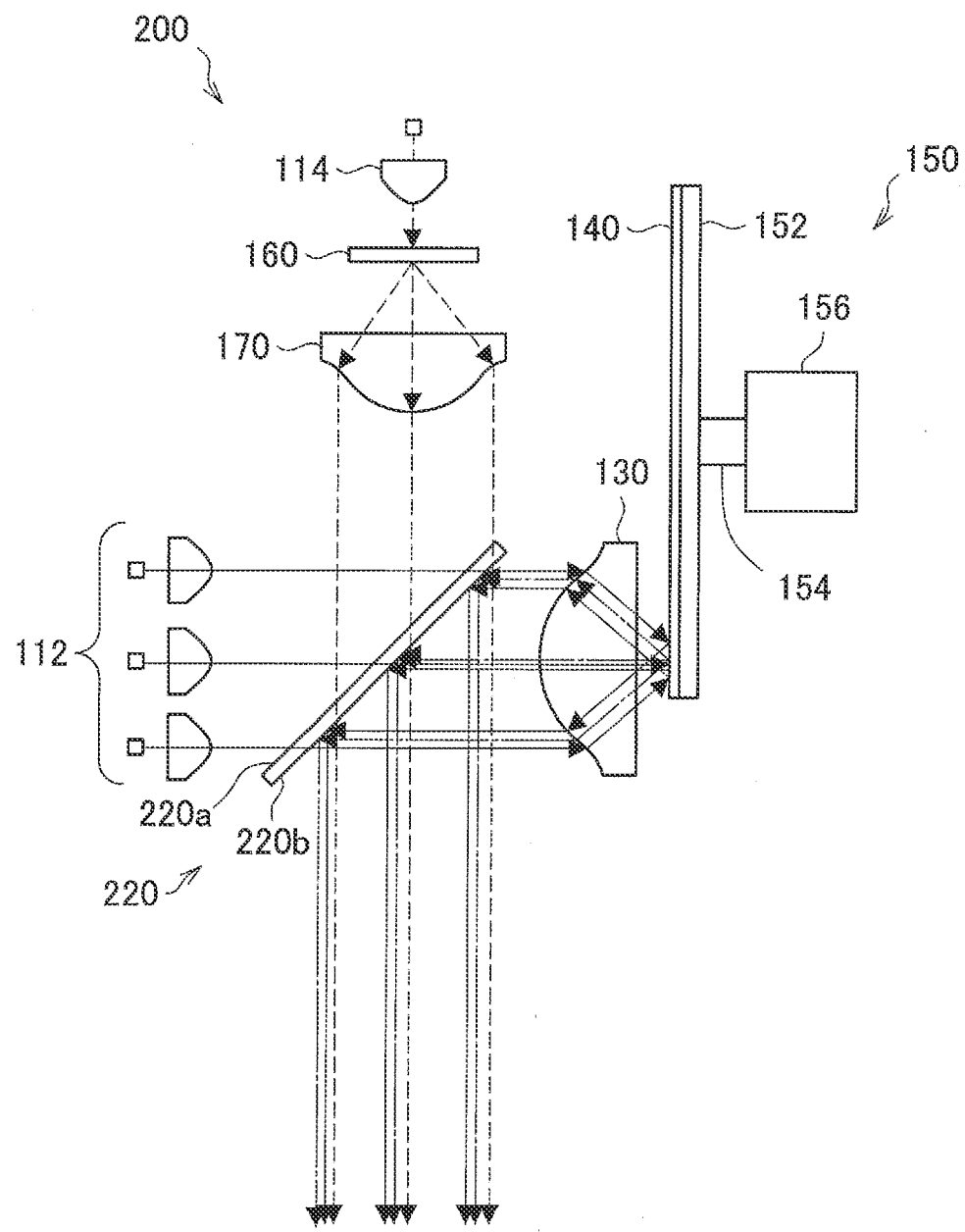
FIG. 7 is a schematic configuration diagram illustrating a configuration of a light source unit according to a second embodiment of the present disclosure.
Figure 8:
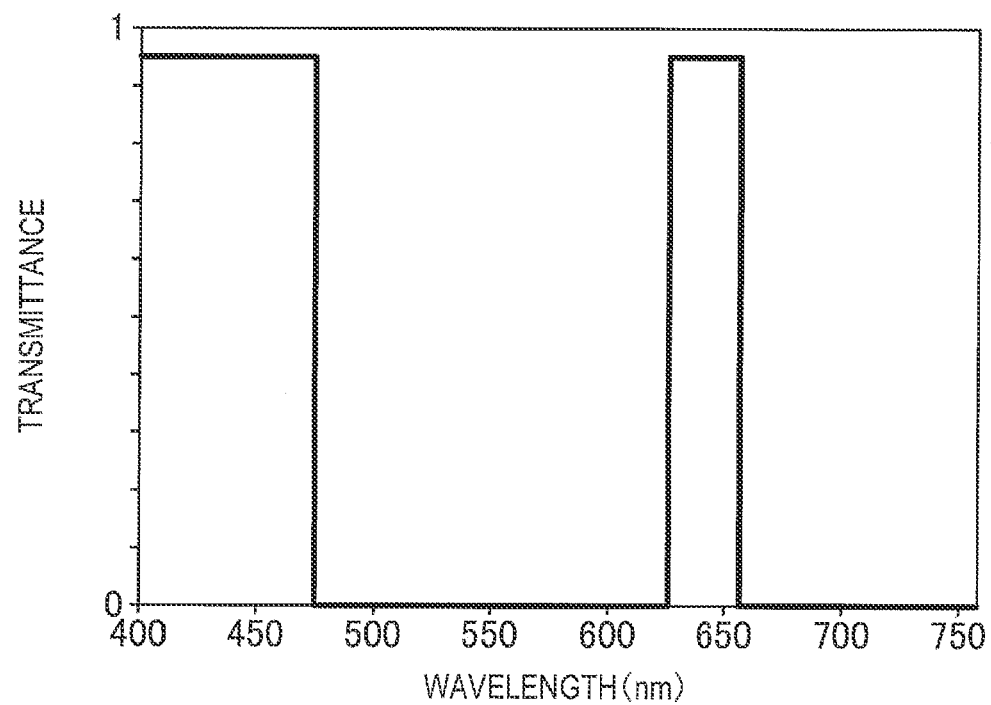
FIG. 8 is an explanatory drawing illustrating one example of characteristics of a dichroic mirror according to the embodiment.
Figure 9:
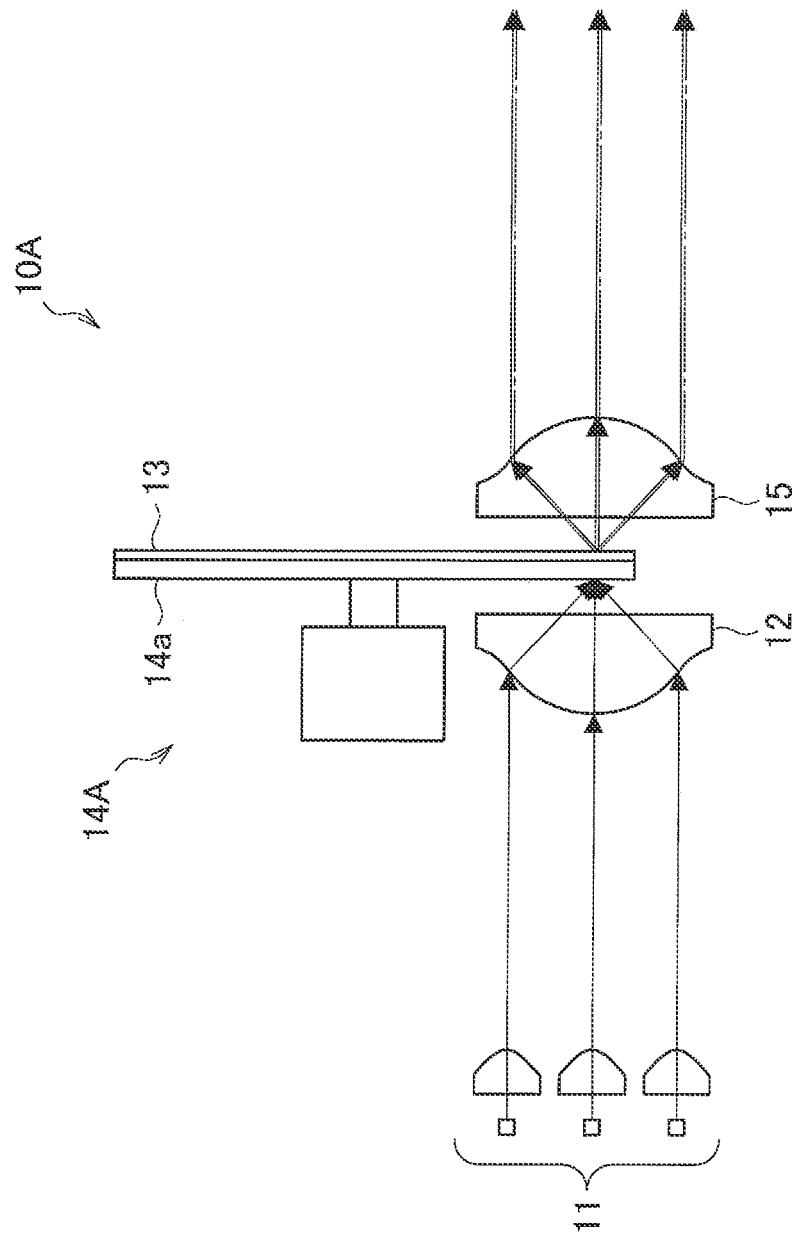
FIG. 9 is an explanatory drawing illustrating one example of a transmission-type light source device according to the related art to the present technology.
Figure 10:
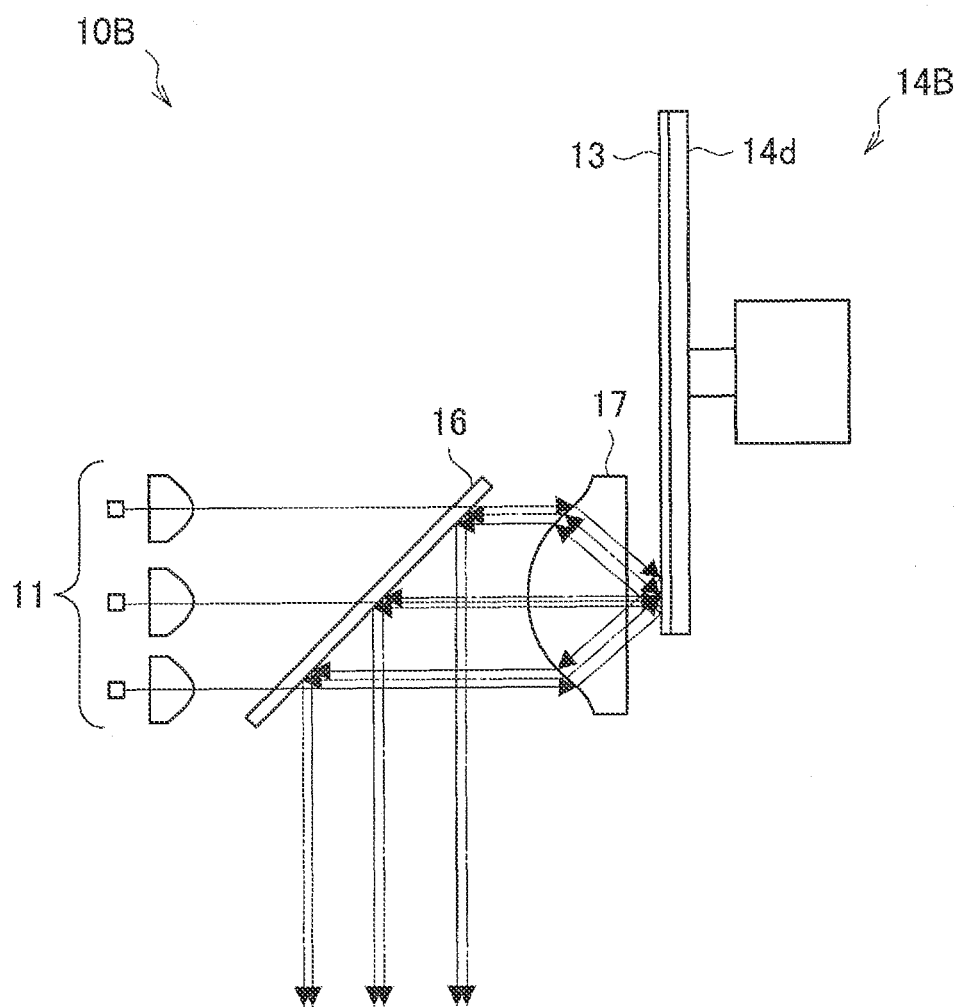
FIG. 10 is an explanatory drawing illustrating one example of a reflection-type light source device according to the related art to the present technology.
Figure 11:
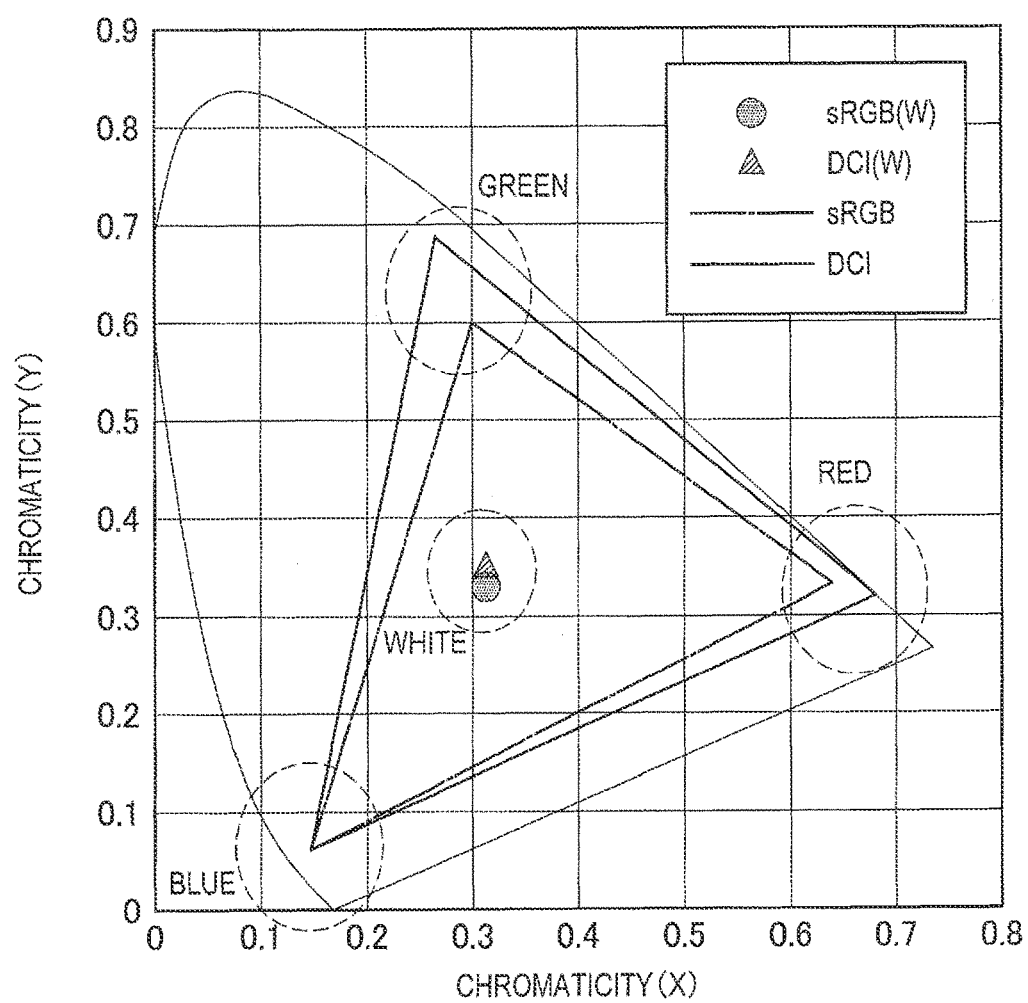
FIG. 11 is a graph illustrating an xy chromaticity chart in the XYZ color system and the color gamuts in DCI and sRGB.

Next, based on FIG. 7 and FIG. 8, one exemplary configuration of a light source unit 200 according to a second embodiment of the present disclosure is described. FIG. 7 is a schematic configuration diagram illustrating one exemplary configuration of the light source unit 200 according to the embodiment. FIG. 8 is an explanatory drawing illustrating one example of characteristics of a dichroic mirror 220 according to the embodiment. In FIG. 7, the constituents same as those of the light source unit 100 according to the first embodiment are given with the same signs and the detailed description for those is omitted.

As in the first embodiment, the light source unit 200 according to the embodiment is provided as a light source unit, for example, for the display device 1 illustrated in FIG.

1. The light source unit 200 is different in the first dichroic mirror 120 which reflects the fluorescent emission light with the fluorescent material and also has the characteristics of the second dichroic mirror 180 functioning as a filter for combination to be integrated into one compared with the light source unit 100 according to the first embodiment. Thereby, the number of constituent components can be made less and not only the light source unit 200 but also the display device 1 are attained to be small, this enabling costs to be reduced.

As illustrated in FIG. 7, the light source unit 200 includes the first light source 112 and the second light source 114 as light sources similarly to the light source unit 100 according to the first embodiment. The first light source 112 is a light source for irradiating (for exciting) a fluorescent material and may employ, for example, a laser. The first light source 112 allows a fluorescent material to emit light efficiently and employs a laser with the blue wavelength region also in the embodiment. The second light source 114 emits light in a wavelength region of the color lacking in the first light source 112 and in the fluorescent emission light with the fluorescent material. Also in the embodiment, since the first light source 112 employs a laser with the blue wavelength region and the fluorescent material employs a YAG-based fluorescent material similarly to the first embodiment, the light is weak in the red wavelength region, and therefore, the second light source 114 according to the embodiment is also configured, for example, of a laser emitting light in the red wavelength region as illustrated in FIG. 4.

Light emitted from the first light source 112 is allowed to be light in two wavelength regions with the dichroic mirror 220, the lens 130 and the fluorescent material 140 which is provided in the rotation wheel unit 150, these constituting the light source unit 200. The lens 130 is disposed on the same optical path as that of the first light source 112 and the dichroic mirror 220 is disposed between the first light source 112 and the lens 130. Moreover, the fluorescent material 140 is disposed such that the lens 130 collects the light on the fluorescent material 140. Here, the lens 130 is desirable to collect the light on the circumferential part of the wheel 152 rather than the vicinity of the center thereof in order to enhance cooling performance of the wheel 152 similarly to the first embodiment.

Since the light from the second light source 114 is also incident on the dichroic mirror 220, the dichroic mirror 220 is provided at the position where the incident direction of the incident light crosses the optical path between the first light source 112 and the lens 130. The dichroic mirror 220 is provided, for example, to incline by approximately 45° relative to the optical path between the first light source 112 and the lens 130 and the incident direction from the second light source 114.

The dichroic mirror 220 allows the light of the first light source 112 incident on a first plane 220a to pass through. Furthermore, the dichroic mirror 220 also allows the light which is led from the second light source 114 and incident on the first plane 220a to pass through. Moreover, the dichroic mirror 220 reflects, on a second plane 220b, the reflected light led from the first light source 112 and the fluorescent emission light from the fluorescent material 140 which is disposed opposite to the first light source 112 via the dichroic mirror 220 and the lens 130. Namely, as illustrated in FIG. 8, the dichroic mirror 220 is configured to have characteristics in which the light in the blue wavelength region and the red wavelength region is allowed to pass through and the light in the other wavelength regions such as the green wavelength region not to pass through.

The light emitted from the first light source 112 passes through the dichroic mirror 220 and is collected with the lens 130 for irradiation of the fluorescent material 140. The fluorescent material 140 is a YAG-based fluorescent material. Upon irradiation with the light in the blue wavelength region from the first light source 112, it absorbs the light and emits light in a different wavelength region from the blue wavelength region. The fluorescent material 140 may be provided on the wheel 152 of the rotation wheel unit 150 to be rotated in order to enhance cooling performance and improve light emission efficiency.

The fluorescent emission light emitted from the fluorescent material 140 is, for example, light in the green wavelength region and passes through the lens 130 along with the light in the blue wavelength region which is not absorbed by the fluorescent material 140 and is reflected on the wheel 152 to be incident on the second plane 220b of the dichroic mirror 220. The dichroic mirror 220 reflects the fluorescent emission light and the reflected light which are incident on the second plane 220b in the emission direction of the light of the light source unit 200.

Meanwhile, the second light source 114 is disposed, relative to the first light source 112, such that the emission directions of the light of these are substantially normal to each other. The light emitted from the second light source 114 is incident on the first plane 220a of the dichroic mirror 220. The first plane 220a of the dichroic mirror 220 also allows the light in the wavelength region for the second light source 114 to pass through. Accordingly, the light from the second light source 114 passes through the dichroic mirror 220 still to proceed in the emission direction of the light of the light source unit 200.

Thus, the dichroic mirror 220 combines the light in the red wavelength region led from the second light source 114 onto the emitted light led from the first light source 112 constituted of the fluorescent emission light and the reflected light. The resulting light has wavelength spectra, for example, as illustrated in FIG. 6 eventually. According to such a configuration of the light source unit 200, the light led from the first light source 112 and the fluorescent emission light led from the fluorescent material 140, which have a deficiency in the emission spectra, can be effectively supplemented with the light in the wavelength region of the deficiency using the second light source 114.

It should be understood by those skilled in the art that various modifications, combinations, sub-combinations and alterations may occur depending on design requirements and other factors insofar as they are within the scope of the appended claims or the equivalents thereof.

For example, in the above-mentioned embodiments, a projector with 3 LCDs as illustrated in FIG. 1 is exemplarily presented as the display device 1 to which the light source unit 100 or 200 is applied, whereas the present technology is not limited to such examples. The system of the display device 1 to which the light source unit 100 or 200 is applied is not limited particularly but a DLP system or a LCOS system may be applied to the display device, for example.

Moreover, in the above-mentioned embodiments, the first light source 112 is a light source for obtaining light in a specific wavelength region (blue wavelength region in the above-mentioned embodiments) and light for irradiation of a fluorescent material, whereas the present technology is not limited to such examples. For example, the light in a specific wavelength region and the light for irradiation of a fluorescent material may be obtained by different light sources. For example, the configuration of the light source unit 100 illustrated in FIG. 3 employs the first light source 112 for the light for irradiation of a fluorescent material. Another light source for the blue wavelength region to obtain the light in the blue wavelength region is provided such that its incident direction of the light is substantially normal to that of the first light source 112 and its light is incident on the first plane 120a of the first dichroic mirror 120. Namely, the light source for the blue wavelength region is provided such that its optical axis coincides with the emission direction of the light of the light source unit 110. Such a configuration can attain the similar effects to those in the above-mentioned embodiments.

Furthermore, in the above-mentioned embodiments, the first light source 112 and the second light source 114 employ lasers, whereas the present technology is not limited to such examples. For example, they only have to be solid-state light sources such as LEDs. A laser is suitable for application to the light source units 100 and 200 according to an embodiment of the present technology, having straightness.

Moreover, the present technology is not limited to the configurations of the light source units 100 and 200 according to the above-mentioned embodiments illustrated in FIG. 3 and FIG. 7. The optical systems can be properly changed to be arranged, and correspondingly, characteristics of the optical systems may be changed. For example, the second dichroic mirror 180 has the characteristics in which the light in a specific wavelength region (red wavelength region) to be combined is reflected and the light in the other wavelength regions is allowed to pass through in the above-mentioned first embodiment. Alternatively, it may have characteristics in which the light in a specific wavelength region (red wavelength region) to be combined is allowed to pass through and the light in the other wavelength regions is reflected according to the incident direction and the emission direction of the light of the second light source 114. In addition, the light source units 100 and 200 are desirable to be disposed such that the light beams in the blue wavelength region, the green wavelength region and the red wavelength region are overlapped in the emission direction of the light of the light source units 100 and 200 to have the same optical axis, and after that, to be emitted.

Furthermore, for the above-mentioned embodiments, the description is made, supposing that the second light source 114 which emits the light in the red wavelength region for the light source units 100 and 200 is provided directly on bases of the light source units 100 and 200, whereas the present technology is not limited to such examples. The wavelength region of the laser emitting the light in the red wavelength region is liable to change depending on its usage temperature. Hence, the second dichroic mirror 180 according to the first embodiment which is configured, for example, as a narrow band filter which reflects the light in the red wavelength region can cause a shift of the wavelength region of the second light source 114, this causing a displacement from the wavelength region of reflection on the second dichroic mirror 180. In turn, a proper supplementation with the light in the wavelength region for the second light source 114 is not attained, this causing imbalance for the color gamut.

Therefore, for example, the second light source 114 may be provided on the base via a temperature keeping mechanism configured of a Peltier element and the like to keep the usage temperature of the second light source 114 constant, and thus, to maintain the wavelength region of the light of the light source 114. Thereby, variation of the wavelength region of the light of the second light source 114 can be reduced regardless of an environment of usage. Moreover, still when variation in production of the second dichroic mirrors 180 causes a displacement of the wavelength region of the reflection from the wavelength region of the light of the second light source 114, the wavelength region of the light of the second light source 114 can be allowed to meet the characteristics of the second dichroic mirror 180.

Additionally, the present technology may also be configured as below.

(1) A light source device including:
a first light source configured to emit light in a first wavelength region;
a second light source configured to emit light in a second wavelength region different from the first wavelength region;
a wavelength conversion unit including a fluorescent material and configured to emit fluorescent emission light in a different wavelength region upon irradiation with the light in the first wavelength region; and
a combining unit that has wavelength selectivity to a specific wavelength region corresponding to the second wavelength region and combines the light in the first wavelength region from the first light source, the light in the second wavelength region from the second light source, and the fluorescent emission light which are incident on the combining unit with one another.

(2) The light source device according to (1),
wherein the light in the first wavelength region, the light in the second wavelength region, and the fluorescent emission light are combined with one another on a same axis.

(3) The light source device according to (1) or (2),
wherein the wavelength conversion unit is provided to be rotatable on a plane which crosses an incident direction of the light of the first light source.

(4) The light source device according to any one of (1) to (3),
wherein the first wavelength region is a blue wavelength region.

(5) The light source device according to any one of (1) to (4),
wherein the second wavelength region is a red wavelength region.

(6) The light source device according to any one of (1) to (5),
wherein at least any one of the first light source and the second light source is a laser diode.

(7) The light source device according to any one of (1) to (6),
further including:
a fluorescent light reflection unit that is provided between the first light source and the wavelength conversion unit, allows the light in the first wavelength region to pass through and reflects the fluorescent emission light toward the combining unit.

(8) A light source device including:
a first light source configured to emit light in a first wavelength region;
a second light source configured to emit light in a second wavelength region different from the first wavelength region;
a wavelength conversion unit including a fluorescent material and configured to emit fluorescent emission light in a different wavelength region upon irradiation with the light in the first wavelength region; and
a combining unit that has wavelength selectivity to a specific wavelength region corresponding to the first wavelength region and the second wavelength region and combines the light in the first wavelength region from the first light source, the light in the second wavelength region from the second light source and the fluorescent emission light which are incident on the combining unit with one another.

(9) A display device including:
a light source unit;

a light modulating/combining system configured to modulate and combine incident light;

an illumination optical system configured to guide light emitted from the light source unit to the light modulating/combining system; and a projection optical system configured to perform projection of an image emitted from the light modulating/combining system, wherein the light source unit includes a first light source configured to emit light in a first wavelength region, a second light source configured to emit light in a second wavelength region different from the first wavelength region, a wavelength conversion unit including a fluorescent material and configured to emit fluorescent emission light in a different wavelength region upon irradiation with the light in the first wavelength region, and a combining unit that has wavelength selectivity to a specific wavelength region corresponding to the second wavelength region and combines the light in the first wavelength region from the first light source, the light in the second wavelength region from the second light source, and the fluorescent emission light which are incident on the combining unit with one another.

(10) A display device including:

a light source unit;

a light modulating/combining system configured to modulate and combine incident light;

an illumination optical system configured to guide light emitted from the light source unit to the light modulating/combining system; and a projection optical system configured to perform projection of an image emitted from the light modulating/combining system, wherein the light source unit includes a first light source configured to emit light in a first wavelength region, a second light source configured to emit light in a second wavelength region different from the first wavelength region, a wavelength conversion unit including a fluorescent material and configured to emit fluorescent emission light in a different wavelength region upon irradiation with the light in the first wavelength region, and a combining unit that has wavelength selectivity to a specific wavelength region corresponding to the first wavelength region and the second wavelength region and combines the light in the first wavelength region from the first light source, the light in the second wavelength region from the second light source, and the fluorescent emission light which are incident on the combining unit with one another.

What is claimed is:

1. A light source device, comprising:
   a first light source configured to emit light in a first wavelength region;
   a second light source configured to emit light in a second wavelength region different from the first wavelength region;
   a wavelength conversion unit that includes a fluorescent material and is configured to emit fluorescent emission light in a third wavelength region, different from the first wavelength region and the second wavelength region, upon irradiation with the light in the first wavelength region,
   wherein the light emitted from the first light source is reflected by the wavelength conversion unit that includes the fluorescent material, wherein the light reflected by the wavelength conversion unit is in the third wavelength region;
   a combining unit that comprises wavelength selectivity to a specific wavelength region that corresponds to the second wavelength region and is configured to combine the light in the first wavelength region emitted from the first light source, the light in the second wavelength region emitted from the second light source, and the fluorescent emission light which are incident on the combining unit;
   a first fluorescent light reflection unit between the first light source and the wavelength conversion unit,
   wherein the first fluorescent light reflection unit is configured to allow the light in the first wavelength region to pass through and reflect the fluorescent emission light; and
   a second fluorescent light reflection unit different from the first fluorescent light reflection unit,
   wherein the second fluorescent light reflection unit is configured to
      allow the light in the first wavelength region and the fluorescent emission light reflected from the first fluorescent light reflection unit to pass through, and
      reflect the light in the second wavelength region.

2. The light source device according to claim 1, wherein the light in the first wavelength region emitted from the first light source, the light in the second wavelength region, and the fluorescent emission light are combined on a same axis.

3. The light source device according to claim 1, wherein the wavelength conversion unit is further configured to be rotatable on a plane which crosses an incident direction of the light of the first light source.

4. The light source device according to claim 1, wherein the first wavelength region is a blue wavelength region.

5. The light source device according to claim 1, wherein the second wavelength region is a red wavelength region.

6. The light source device according to claim 1, wherein at least one of the first light source or the second light source is a laser diode.

7. The light source device according to claim 1, wherein the fluorescent material is a YAG-based fluorescent material.

8. A light source device, comprising:
   a first light source configured to emit light in a first wavelength region;
   a second light source configured to emit light in a second wavelength region different from the first wavelength region;
   a wavelength conversion unit that includes a fluorescent material and is configured to emit fluorescent emission light in a third wavelength region, different from the first wavelength region and the second wavelength region, upon irradiation with the light in the first wavelength region,
   wherein the light emitted from the first light source is reflected by the wavelength conversion unit that includes the fluorescent material, wherein the light reflected by the wavelength conversion unit is in the third wavelength region;
   a combining unit that comprises wavelength selectivity to a specific wavelength region that corresponds to the first wavelength region and the second wavelength region and is configured to combine the light in the first wavelength region emitted from the first light source, the light in the second wavelength region emitted from the second light source, and the fluorescent emission light which are incident on the combining unit;

a first fluorescent light reflection unit between the first light source, and the wavelength conversion unit, wherein the first fluorescent light reflection unit is configured to allow the light in the first wavelength region to pass through and reflect the fluorescent emission light; and a second fluorescent light reflection unit different from the first fluorescent light reflection unit, wherein the second fluorescent light reflection unit is configured to allow the light in the first wavelength region and the fluorescent emission light reflected from the first fluorescent light reflection unit to pass through, and reflect the light in the second wavelength region.

9. The light source device according to claim 8, wherein the fluorescent material is a YAG-based fluorescent material.

10. A display device, comprising:

a light source unit;

a light modulating/combining system configured to modulate and combine incident light;

an illumination optical system configured to guide light emitted from the light source unit to the light modulating/combining system; and a projection optical system configured to project an image emitted from the light modulating/combining system, wherein the light source unit comprises:

a first light source configured to emit light in a first wavelength region;

a second light source configured to emit light in a second wavelength region different from the first wavelength region;

a wavelength conversion unit that includes a fluorescent material and is configured to emit fluorescent emission light in a third wavelength region, different from the first wavelength region and the second wavelength region, upon irradiation with the light in the first wavelength region, wherein the light emitted from the first light source is reflected by the wavelength conversion unit that includes the fluorescent material, wherein the light reflected by the wavelength conversion unit is in the third wavelength region;

a combining unit that comprises wavelength selectivity to a specific wavelength region that corresponds to the second wavelength region and is configured to combine the light in the first wavelength region emitted from the first light source, the light in the second wavelength region emitted from the second light source, and the fluorescent emission light which are incident on the combining unit;

a first fluorescent light reflection unit between the first light source and the wavelength conversion unit, wherein the first fluorescent light reflection unit is configured to allow the light in the first wavelength region to pass through and reflect the fluorescent emission light; and a second fluorescent light reflection unit different from the first fluorescent light reflection unit, wherein the second fluorescent light reflection unit is configured to allow the light in the first wavelength region and the fluorescent emission light reflected from the first fluorescent light reflection unit to pass through, and reflect the light in the second wavelength region.

11. The display device according to claim 10, wherein the fluorescent material is a YAG-based fluorescent material.

12. A display device, comprising:

a light source unit;

a light modulating/combining system configured to modulate and combine incident light;

an illumination optical system configured to guide light emitted from the light source unit to the light modulating/combining system; and a projection optical system configured to project an image emitted from the light modulating/combining system, wherein the light source unit comprises:

a first light source configured to emit light in a first wavelength region;

a second light source configured to emit light in a second wavelength region different from the first wavelength region;

a wavelength conversion unit that includes a fluorescent material and is configured to emit fluorescent emission light in a third wavelength region, from the first wavelength region and the second wavelength region, upon irradiation with the light in the first wavelength region, wherein the light emitted from the first light source is reflected by the wavelength conversion unit that includes the fluorescent material, wherein the light reflected by the wavelength conversion unit is in the third wavelength region;

a combining unit that comprises wavelength selectivity to a specific wavelength region that corresponds to the first wavelength region and the second wavelength region and is configured to combine the light in the first wavelength region emitted from the first light source, the light in the second wavelength region emitted from the second light source, and the fluorescent emission light which are incident on the combining unit;

a first fluorescent light reflection unit between the first light source and the wavelength conversion unit, wherein the first fluorescent light reflection unit is configured to allow the light in the first wavelength region to pass through and reflect the fluorescent emission light; and a second fluorescent light reflection unit different from the first fluorescent light reflection unit, wherein the second fluorescent light reflection unit is configured to allow the light in the first wavelength region and the fluorescent emission light reflected from the first fluorescent light reflection unit to pass through, and reflect the light in the second wavelength region.

13. The display device according to claim 12, wherein the fluorescent material is a YAG-based fluorescent material.

* * * * *